United States Patent [19]

Heady

[11] Patent Number: 4,922,236

[45] Date of Patent: May 1, 1990

[54] FIBER OPTICAL MOUSE

[76] Inventor: Richard Heady, 3140 Emerson St., San Diego, Calif. 92106

[21] Appl. No.: 185,973

[22] Filed: Apr. 25, 1988

[51] Int. Cl.$^5$ .................................................. G09G 1/00
[52] U.S. Cl. ................................... 340/710; 340/706; 340/707
[58] Field of Search ....................... 340/706, 707, 710; 250/221, 227; 178/18

[56] References Cited

U.S. PATENT DOCUMENTS

| | | | |
|---|---|---|---|
| 3,579,225 | 5/1971 | Clark | 340/707 |
| 3,680,078 | 7/1972 | Baskin et al. | 340/707 |
| 3,852,721 | 12/1974 | Tucker et al. | 340/707 |
| 4,364,035 | 12/1982 | Kirsch | 340/710 |
| 4,390,873 | 6/1983 | Kirsch | 340/710 |
| 4,409,479 | 10/1983 | Sprague et al. | 250/237 |
| 4,521,772 | 6/1985 | Lyon | 340/710 |
| 4,521,773 | 6/1985 | Lyon | 340/710 |
| 4,546,347 | 10/1985 | Kirsch | 340/710 |
| 4,631,400 | 12/1986 | Tanner et al. | 250/221 |
| 4,647,771 | 3/1987 | Kato | 250/237 |
| 4,691,199 | 9/1987 | Shell | 340/710 |
| 4,712,100 | 12/1987 | Tsunekuni et al. | 340/710 |
| 4,716,287 | 12/1987 | Nestler | 250/227 |
| 4,751,380 | 6/1988 | Victor et al. | 250/221 |
| 4,751,505 | 6/1988 | Williams et al. | 340/710 |

FOREIGN PATENT DOCUMENTS 1171822  8/1985  U.S.S.R. .............................. 340/707

*Primary Examiner*—Jeffery A. Brier

[57] ABSTRACT

A relative-motion cursor control device configured as a pen permits fine control of the cursor. Optical fibers are employed to reduce to nib-size the active, sensory surface of an optical mouse. In the preferred embodiment, two bundles of optical fibers are orthogonally arrayed with hexagonal packing against a passive referent image. Quadrature logic translates edge crossings into unambiguous motion in an X-Y plane. Each fiber in the bundles acts as both source and receptor of light to and from the spot under it in the referent image. Light is directionally injected into each fiber with simple, bent-fiber coupling. Hexagonal packing automatically adjusts for the fiber's inactive cladding thus permitting a larger diameter and maximum light transmission. Contrast enhancement compensates for optical losses and noise.

14 Claims, 1 Drawing Sheet

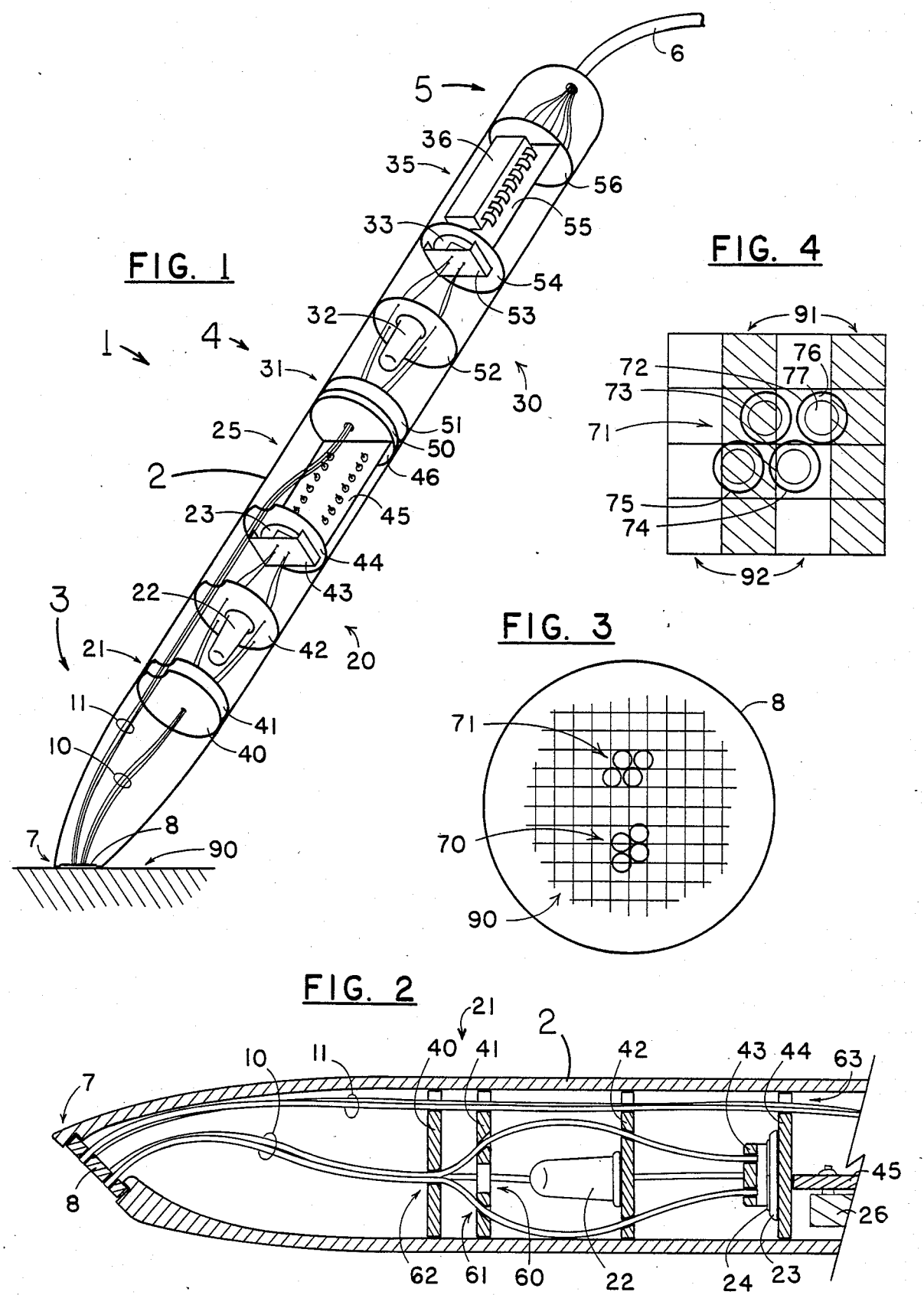

FIBER OPTICAL MOUSE

FIELD OF INVENTION

A cursor control device allows a user to position, interactively, a small image, the 'cursor', on a video display. A relative-motion cursor control device determines its own motion or analogous state in relation to a referent object, surface, or field; it does not determine position within a coordinate system. An optical relative-motion cursor control device uses optical information to cue its changing position, employing optoelectronic and electronic components to translate the optical information to the coded electronic signals expected by a particular video display device. An optical fiber is a fiber composed of glass, plastic or other translucent material, which acts as a flexible waveguide for light. The present invention is an optical relative-motion cursor control device employing optical fibers.

BACKGROUND TO THE INVENTION

The primary objective of the present invention arose from the need for an inexpensive cursor control device which could be manipulated with the ease and fine control of a pen.

Cursor control devices are of two basic kinds:

(1) position detectors such as digitizers, graphics tablets and light pens. These devices typically require an energized referent field or surface which in the case of a light pen may be the video display itself. In most such systems the moving component is also energized; in a few, a passive stylus is employed to deform a referent field.

(2) relative-motion detectors, further divided into:

(a) fixed devices such as trackballs and joysticks. These devices sense the movement or analogous state of an active component (ball or stick) held within a fixed housing.

(b) moving devices, the most popular of which is the 'mouse'. These devices sense their own movement against a passive referent field or surface which in the case of a mechanical mouse may be any frictional surface. Reduced to an extreme, the referent field could be simply the inertia of a massive, self-contained component.

Evaluated against the primary objective, position detectors already met all of the requirements except expense, but they were dropped from consideration because their expense appeared irreducibly bound to the information needed to determine position. Fixed, relative-motion detectors were rejected because none could be manipulated like a pen in an obvious way. (Still, the joystick holds promise as a fine-control device.)

Concentrating on the remaining alternative, the mouse, spawned a secondary objective: to reduce to nib-size that portion of the moving device which must directly address the referent field or surface.

Two versions of the mouse were considered:

(1) The typical mechanical mouse senses the rotation of two, orthogonally deployed wheels or the rotation of a ball translated through two wheels. Because of its low cost and because it requires no referent other than a frictional surface, the mechanical mouse has become the most popular of cursor control devices.

(2) The optical mouse is best represented by the electro-optical mouse invented by Steven T. Kirsch and disclosed in U.S. Pat. Nos. 4,364,035, 4,390,873 and 4,546,347. The optical mouse improves on the internal workings of the mechanical mouse by eliminating the moving parts, but does so at the expense of requiring a specific referent image. This not only adds a component but also precludes its use for tracing (as was pointed out by William W. Shores in his invention titled "Tracing Aid for Computer Graphics," U.S. Pat. No. 4,561,183).

In the course of the present invention, various attempts were made to shape the mechanical mouse as a pen; none was successful, and the solution to this problem is left for a future invention. The present invention is based solely on the optical mouse.

During the evolution of the optical mouse, a number of different logical schemes have been patented for determining relative motion against a referent image. In the most abstract view, all such schemes correlate the movement of a device over a referent surface to a change of state. This change of state begins as a change in the optical information sampled by the device. The optical signals are transduced to electronic signals; the electronic signals are then amplified, filtered, compared and otherwise logically processed to produce the electronic code which will drive a cursor in related movement over a video display.

An early example of the optical mouse employed a checkerboard pattern as a referent image and required a look-up table as means for mapping the change of state to the electronic code for driving a cursor. This was the "electronic mouse" disclosed by Kirsch in his earliest patent application U.S. Pat. No. 4,390,873, filed on May 18, 1981. Later versions of Kirsch's "electro-optical mouse" have employed a logic base on a grid composed of spaced lines of two separately detectable colors. This logical scheme represents a convergent evolution of the optical mouse and the mechanical mouse; both have come to employ optoelectronics and the logic of 'quadrature' to detect incremental movement.

Quadrature is a simple algorithm for edge detection wherein two detectors approach a transition a quarter (90°) out of step with each other. Comparing the change of one signal ('going on' or 'going off') against the state of the other ('on' or 'off') differentiates between motion forward or backward along a single axis. The following two examples illustrate the convergent evolution of the two kinds of mice toward this algorithm:

(1) In a popular embodiment of the mechanical mouse, a ball rolling over a surface spins two slotted wheels on orthogonal axes. Each spinning wheel cuts two light beams. The beams are offset relative the slots by just the amount needed to produce a 90° phase difference between their signals, i.e., if one beam is at the edge of a slot, the other is in the center of a slot.

(2) In the later versions of Kirsch's electro-optical mouse, reflected light from a ruled grid produces an optical signal analogous to that produced by the spinning shutters. In place of the two spinning shutters, two colors of lines illuminated by two colors of light differentiate the orthogonal axes. (Actually, a single color of light may be employed so long as the grid presents three levels of edge contrast to the edge and state detectors.)

The advantage of quadrature over other algorithms is that it is so simple that no state tables are required; the detectors themselves carry the necessary state information.

While quadrature is the preferred algorithm, other logical means have been developed for which the present invention has application. One good example is the optical mouse described as a possible application of the "Imaging Array" disclosed by Richard F. Lyon in U.S. Pat. No. 4,521,773. The Imaging Array is a generalized device wherein optical information contained in a bitmap covering a large area is sampled by an array of sensors addressing a small area. This sample of optical information may go through intermediate processing depending on how the individual sensors interact (to inhibit, to excite, or to do nothing to one another). A transition table then translates the changing state of the intermediate array into the electronic code driving a cursor.

DISCLOSURE OF THE INVENTION

Two objectives, (1) the primary objective of creating an inexpensive, pen-like cursor control device, and (2) the consequent objective of reducing to nib-size the portion of the device which must address a referent surface, are met by the present invention, a 'fiber optical mouse'. The fiber optical mouse employs optical fibers to capture light reflected from a referent image, to transmit, and to focus this reflected light onto individual photocells so as to produce electronic signals which, when amplified, filtered, compared and otherwise electronically processed will drive a cursor over a video display.

In its preferred embodiment, the fiber optical mouse is sized and shaped like a fat pen. All optoelectronic components—light sources, injection components, and photodetectors—are positioned in the main body or barrel of the device, along with just enough electronic circuitry to amplify the electronic signals from the photodetectors for transmission to a remote unit. The remote unit contains the remaining logical circuitry and may act as a switching terminal for other cursor control devices. Optical fibers are fixed in a nib at the tip of the device in a precise geometric array. Light captured from the referent image is transmitted by these sensory fibers in a loose bundle back into the barrel of the device. In the barrel, each fiber is routed individually to illuminate a specific photodetector cell.

Illumination of the referent surface may come from outside sources (unlikely given the extremely narrow angle of acceptance of optical fibers), from a separate light tube or bundle of fibers within the device, or from the sensory fibers themselves. For the last method, light from a source positioned in the barrel of the device is injected into each sensory fiber in the direction of the nib. This method is preferred for several reasons: it requires fewer components; it automatically solves the problem of reflectively aligning light source and light sensors; and it reduces the chance for ambient light to leak into the sensory fibers as optical noise. A disadvantage of this method is that the weak, reflected light must return through the injection component where it will bleed out with the same efficiency as the source light was injected in the forward direction.

Much of the advantage of the fiber optical mouse over present technique in the design and manufacture of optical mice derives from the advanced state of fiber-optic technology. Optical fibers are at once inexpensive and precisely dimensioned. Introducing their precision into an optical mouse reduces or eliminates the requirements for close-tolerance fabrication of connected and related components. Photodetectors and light sources, for example, may be positioned anywhere to very rough tolerances within the housing of the fiber optical mouse.

Optical fibers transmit light signals with essentially no attenuation, dispersion or other degradation to distances much greater than those required for the interactive use of a video display device. This permits a wide latitude in the configuration of a fiber optical mouse; the optoelectronic and electronic components can be placed any distance from the sensory surface. As an extreme example, the 'slim-line' embodiment of the present invention would transmit purely optical signals through a fiber optical cable to a remote unit containing all of the optoelectronic and electronic components.

In operation, the user grasps and manipulates the fiber optical mouse in the same manner as a pen. Drawing with this device is not quite as easy as drawing with a pen or paper or with a stylus on a graphics tablet, this because the plane of the optical nib must be kept roughly parallel to the referent surface. Neither is the fiber optical mouse as handy as a standard optical or mechanical mouse for grabbing and pointing quickly to a small area of the video display, nor is it as free as the mechanical mouse from a specific referent surface. The operational advantage of the present invention over the standard optical or mechanical mouse and over other devices of prior art is that the fiber optical mouse is an inexpensive device in a familiar shape which permits the user very fine control of the cursor on a video display.

DESCRIPTION OF THE DRAWINGS

FIG. 1 is a perspective view of the preferred embodiment showing the layout of the major components and the routing of the optical fibers from tip to detectors.

FIG. 2 is a plan view of the nose and a portion of the barrel showing a complete run of one bundle of optical fibers.

FIG. 3 is a diagram showing the layout of the X and Y fiber optical arrays in the nib of the device and comparing this layout to a figurative grid representing the referent image.

FIG. 4 is a diagram showing how an array of four fibers in hexagonal packing may be deployed to detect edge crossings.

DESCRIPTION OF THE PREFERRED EMBODIMENT

The preferred embodiment of the fiber optical mouse adopts for its basis the logical means, optoelectronics, and electronic circuitry of the electro-optical mouse invented by Steven T. Kirsch in U.S. Pat. No. 4,545,347. As discussed above in "background," other means for the optical mouse can be used as bases for other embodiments of the present invention. Kirsch's version of the optical mouse is particularly suited to the preferred embodiment because of Kirsch's use of contrast enhancement and of quadrature logic.

From here until the subsection titled "Alternative embodiments," all description refers to the preferred embodiment unless specifically noted. All numbers in brackets, as [12] for example, refer to the numbered component shown on the drawings. Where a named component is the same for both X and Y modules and both components appear somewhere in the drawings, both numbers may be referenced in brackets, as [x 55, y 45] for example.

In broad form:

FIG. 1 shows the general form and layout of the preferred embodiment. The fiber optical mouse [1] is shaped like a fat pen. The pen-like device contains all necessary optical and optoelectronic components but has room only for the minimum electronics required to amplify the signals from the photodetectors to transmission strength. All logical processing is carried out in a remote unit which is not shown because it is prior art (chiefly of Kirsch's invention).

The housing [2] for the fiber optical mouse [1] is formed of plastic in two longitudinal halves. It has a tapering [3] nose in front, a main body [4] in the form of a cylindrical barrel, and a roughly hemispherical end cap [5] at the rear from which an electronic cable [6] exits like a mouse's tail. The nose [3] tapers to a tip [7] containing the nib [8] and has room for one or more micro switches. (The switches are optional and therefore suppressed in the drawings.) The main body [4] of the device contains two nearly identical modules [x 30, y 29], labelled X and Y for the axes on which they detect motion. Each module is comprised of a light-emitting diode ('LED'), an injection component [x 31, y 21], a quadrant-cell photodetector [x 33, y 23], and an electronic amplifier [x 35, y 25]. The amplifier consists of an operational amplifier integrated circuit ('op-amp IC') [x 36, y 26] and related circuitry mounted on a printed circuit board ('PC board') [x 55, y 45]. The end cap [5] serves as a connection and routing station for the cabled wires [6] which connect the fiber optical mouse [1] to its remove unit. All of the components except the PC board [x 55, y 45] are mounted on disk-shaped, plastic cross pieces at various longitudinal stations within the housing [2]. Threading through holes in these cross pieces, are two bundles of optical fibers, the X and Y bundles [x 11, y 10], which run from the nib [8] to the photodetectors [x 33, y 23] in their respective modules.

Structure and components:

FIG. 2 shows the details of the nose [3] and of a complete run of the Y bundle of optical fibers [10] from nib [8] to photodetector [23]. FIG. 3 shows how the optical fibers are arrayed in the nib [8]. In order to approximate the attitude of a pen in normal use, the tip [7] of the fiber optical mouse [1] is angled at approximately 45° to the longitudinal axis. A recess for the nib [8] is molded into the tip [7]; the recess connects through a large hole to the interior of the device, this for the free passage of the optical fibers connected to the nib [8]. The nib [8] is a disk of relatively thick plastic, pre-drilled to receive the sensory ends of the optical fibers. The size of each hole is the nominal size of the optical fiber plus the fiber's manufacturing tolerance. Each hole is precisely perpendicular to the surface of the nib [8], and each hole is positioned precisely in relation to the other three members in its array. Less precisely, the X and Y arrays [x 71, y 70] are perpendicular to each other and in reasonably close association (close association prevents the two arrays [x 71, y 70] from going in and out of focus at different times as the tip [7] is tilted in use). Very roughly, the arrays [x 71, y 70] are centered in the nib [8].

The X and Y modules [x 30, y 20] are identical in the number and arrangement of their components; they differ only in the color of light each employs. Each module is built on a structure of disc-shaped, plastic cross pieces. (FIG. 1 shows all of the cross pieces: the Y pieces are numbered 40, 41, 42, 44 and 46; the X pieces are 50, 51, 52, 54, and 56.) These cross pieces are pre-drilled for the optical fibers and for the passage of electronic wiring. Because the X modules optical fiber bundle [11] must pass through the Y module [20], the two are assembled at the same time on one jig. Once the jigged assembly is complete, the fibers strung, and all the wiring soldered or otherwise connected, the whole is placed into the receiving half of the housing [2]. Each cross piece is glued to alignment slots which project from the inside of both the receiving and closing halves. The closing half of the housing [2] is then set into place and secured with small screws; the cross pieces are not glued to the closing half.

The following description of the Y module [20] runs roughly according to the order of the module's assembly on the jig, back to front. The two cross pieces at the rear of the Y module are named the forward [44] and aft [46] bulkheads. Between them in mirror image slots, they hold a small PC board [45] which has its plane parallel to and slightly offset from the central longitudinal axis of the device. The PC board [45] carries a single op-amp IC [26] and related circuit components. Mounted on the forward side of the forward bulkhead [44] is a quadrant-cell photodetector [23] connected electronically to the op-amp IC [26]. Glued in place over the photodetector [23] is a U-shaped frame of plastic called the terminal piece [43]. It is pre-drilled to receive and to focus the Y bundle's fibers onto each of their respective photocells [24]. At the time of assembly, these fibers have already been secured to the terminal piece [43] (this is described more completely below).

Coming forward from the photodetector [23], the next three cross pieces are named the source [42], bending [41], and gathering [40] pieces. The source piece [42] has an LED [22] mounted on its forward face facing forward. Around the LED [22], four holes are drilled for passage of the optical fibers [10]; the holes are spaced equidistant on a circle of radius approximately 5 millimeters. At the next station forward, the bending piece [41] has a 'light hole' drilled directly in line with the focused light from the LED [22]. Spaced evenly on a circle around this hole, four 'bending holes' [61] are drilled for the optical fibers [10] at an angle of approximately 45° to the plane of the bending piece [41], angling in toward the front. The bending holes [61] are relieved on the rear surface to reduce shear stress on the fibers. At the foremost station in the Y module [20], the gathering piece [40] has a single 'gathering hole' [62] drilled at the center of the axis established by the focused LED [22] and the light hole [60]. The gathering hole [62] is sized just large enough to accommodate the four fibers of the Y optical bundle [10] in square packing. Together, the bending and gathering pieces [41 and 40] comprise the injection component [21].

After the Y module [20] has been assembled on the jig, the X module [30] is a fabricated in similar fashion, the only difference being that the X bundle of optical fibers [11] passes through a large hole in the aft bulkhead [46] of the Y module and is laid into a channel [63] on the perimeter of the Y cross pieces.

The optical fibers:

FIG. 3 shows two arrays [x 71, y 70] composed of four fibers each, all deployed against a figurative grid [90] as a referent image. As illustrated in FIG. 4, the diameter of the fibers is chosen to match the resolution of the referent image: a pair of edge and state detecting fibers (e.g., the fibers numbered 72 and 74) will together fit roughly into the width of a line [91] or of a space [92]. A larger diameter makes the device easier to fabricate and more forgiving to optical misalignment caused by tilting of the plane of the nib [8] to the plane of the referent image [90]. To gain the advantages of the largest possible diameter, the fibers within a single array are arranged in hexagonal packing. FIG. 4 is meant to demonstrate how quadrature logic is used to determine movement of a single hexagonal array [71] in relation to a set of lines [91] and spaces [02]. Functionally, as the array of fibers [71] moves to the right, fiber 72 minus fiber 73 signals that the current edge detector is changing towards 'off' (little or no reflected light); fiber 74 minus fiber 75 signals that the current state detector is 'on'. A change of the edge detector toward 'off' compared to the state detector being 'on' unambiguously signals movement to the right FIG. 4 also indicates how contrast enhancement permits a relatively wide latitude in the diameter of the fibers and how hexagonal packing automatically compensates for the non-transmissive cladding which surrounds the optical core [77] of the fibers.

The fibers are cut to length and polished before assembly. During assembly, each bundle of fibers [x 11, y 10] is first secured to its terminal piece [x 53, 7 43]. The terminal piece [x 53, y 43] is glued into place over the photodetector [x 33, y 23]. The fibers are then threaded through the source piece [x 52, y 42], bending piece [x 51, y 41], and gathering piece [x 50, y 40] as each cross piece is set into place on the jig. The Y module [20] is assembled first, the X bundle of fibers [11] is laid into a channel [63] on the outer perimeter of the Y cross pieces. After both modules [x 30 and y 20] are assembled on the jig, the proximal or sensory ends of the optical fibers are secured in the nib [8]. At both nib and terminal piece [x 53, y 43], the fibers are secured by gluing them in epoxy cement after pushing each home against a temporary backing plate of lubricated glass. The nib [8] is not fastened to the jig but rides freely held by the optical fibers until the whole assembly is positioned and glued into the receiving half of the housing [2].

Operation:

The X and Y modules [x 30, y 20] are identical in operation. The operation of the Y module [20] is described in the following with particular reference to the details shown in FIG. 2.

Light from the LED mounted on the source piece [42] is focused through the light hole [60] in the bending piece [41] onto the four optical fibers [10] as these fibers are forced through a tight turn from their separate bending holes [61] into the common gathering hole [62]. A large amount of the strongly focused light bleeds into each bent fiber and is carried by it forward to the nib [8].

At the nib [8], the light exits each fiber to illuminate the tiny spot of the referent image directly under the fiber. Light reflects from this spot with an intensity that is a function of the color of the light and the color of the spot. Due to the perpendicularity of the fibers to the referent image, to the specular surface of the image, and to the extreme collimation of optical fibers in general, most of the light reflected from a given spot is captured by the same fiber that illuminates it.

The reflected light is carried by each fiber back through the nose, through the injection component [21] and source piece [42], to the terminal piece [43] where it exits the fiber to illuminate a particular cell [24] of the photodetector [23]. Losses during transmission of the reflected light from the nib [8] to the photodetector [23] are severe. The worst loss occurs as the reflected light is focused through the bend in the injection component [21]; the more efficient the injection of source light, the more loss the reflected light suffers here on return. Other losses are due to reflection on entry at the nib [8], to end-reflection at the terminal piece [43], to attenuation caused by the material of the optical core (which may be severe in certain regions of the infrared spectrum), and to a host of minor imperfections in the geometry and composition of the optical fibers. Moreover, optical noise is created by echo from the nib-end, by backscatter from micro-defects in the core material, and by bleeding into the fiber of ambient light within the barrel of the device. (This internal ambient light is from the LED's multiply reflected and refracted.) In the preferred embodiment, contrast enhancement compensates adequately for all of these losses and for all introduced noise.

The quadrant-cell photodetector [23] converts the four optical signals to electronic signals; these are immediately amplified by the opamp IC [26] and related circuitry mounted on the PC board [45] directly behind the photodetector [23]. From the PC board [45], the amplified signals are carried to a connecting device (not visible in FIG. 1) mounted on the rear of the rearmost cross piece [56]. Here they feed into the cable [6] and from here the signals are sent to a remote unit for final processing.

Alternative embodiments:

The preferred embodiment occupies the middle ground between a 'slimline' and a 'boxy' fiber optical mouse.

In a slim-line fiber optical mouse, the optical fibers themselves compose the cable connecting the moving device to the remainder of the system. The moving device houses only the nib and the optical bundles (along with an optional number of micro switches). The optical fibers run continuously from the nib in the moving device through the cable to their termination in a stationary, remote unit. All light injection and detection and all electronic processing is performed in the remote unit. Because the optical fiber cable is much more rigid and springy than the preferred embodiment's electronic cable, its positioning and deployment must be explicity treated. One treatment would be to have the cable come out of the remote unit in a vertical direction and then describe an arc through approximately 235° to bring it close to and in correct alignment with the working surface. When not in use, this slim-line fiber optical mouse would sit in a pen holder fixed to the front of the remote unit.

The only advantage of this embodiment is the increased ease with which the slim, pen-shaped device can be manipulated. Disadvantages include:

(a) The full system occupies too much working volume due to the arc described by the optical cable.

(b) The user is constrained to work in close proximity to the remote unit.

(c) The device requires a more efficient means of light injection and may also require a higher quality of optical fiber (with a glass instead of plastic core, for example) in order to achieve adequate transmission efficiency.

At the other end of the configuration spectrum, a large and boxy fiber optical mouse houses not only the optical and optoelectronic components but also all of the logical components and circuitry. It connects directly to the computer or other video display device with no need for an intervening unit. Using only standard, commercially available components, this embodiment is approximately the size of an electronic logic probe. The housing is box-shaped with dimensions approximately 2 centimeters deep by 3 centimeters wide by 14 centimeters long. A nose, nearly identical to the nose [3] of the preferred embodiment, extends approximately 3 to 4 centimeters in front of the box.

Advantages of this alternative embodiment over the preferred embodiment include:

(a) The full system is contained in one device instead of being split into a moving device plus a remote unit.

(b) The efficiency of fabrication and assembly is markedly improved by going to a box-shaped housing. The housing's size and shape permit the optoelectronics (LED's and photodetectors) for the X and Y modules to be mounted in parallel on a single component. A single PC board serves for all of the electronic circuitry. This is much easier to manufacture than the preferred embodiment with its cylindrical housing containing two, in-line modules interlaced with optical fibers and wires.

The disadvantage and the sole reason that this alternative is not the preferred embodiment is that it is not as handy as a pen. The device is too heavy and too large to be held and manipulated easily.

Variations:

The following are variations in components and fabrication which might improve the preferred and alternative embodiments.

Variations which might strengthen the illumination of the referent image and/or improve transmission of the reflected light include:

(1) A more sophisticated method of light injection would increase the amount of light incident on and reflected from the referent image thus making the device more robust though not necessarily more sensitive.

(a) The fibers could be bent and set into a solid plastic matrix. The matrix material would have an index of refraction approximately equal to that of the fibers' cladding. Light would be injected into the matrix and thence into the fibers in the direction of the nib.

(b) A half-mirrored surface could be created in each fiber by the standard method of cutting at 45° and rejoining the cut ends. The half-mirrored surfaces would then be positioned over the LED and aligned radially to it so as to capture and reflect incident light in the direction of the nib.

(c) A separate set of fibers could be directly injected with light. Each fiber of this set would then be joined to a corresponding sensory fiber by making a helical winding of the two fibers about each other. The end of the injection fiber would be cut at the 'Brewster's angle' to its long axis, this to eliminate end-reflection and the consequent reverse injection of source light directly toward the photodetector.

(d) A separate set of fibers could be injected with light and each of these fibers spliced to a sensory fiber using a half-mirrored T-joint.

(2) Separating the illuminant fibers from the sensory fibers would increase the sensitivity of the device. This could be done (a) with equal numbers of illuminant and sensory fibers. Each pair of fibers would be fixed in the nib in precise optical alignment—illuminant to sensor.

(b) with a single large-diameter illuminant fiber surrounded by small-diameter sensory fibers. The nib-end of the illuminant fiber would have a convex shape in order to spread the emitted light radially. The sensory fibers might be beveled to improve their capture of off-axis light rays. This variation would require a new logical means to take into account the dead space in the center of the optical array.

(c) by embedding the sensory fibers in a plastic light tube. Coming away from the nib, the sensory fibers would separate from the light tube to run as a bundle to their photodetectors; the light tube would terminate against and be flooded by a focused light source.

Variations in the logical means of the optical mouse system include:

(1) the optical positioning method described in Kirsch's earliest application for an optical mouse, U.S. Pat. No. 4,390,873, which employed "a high contrast checkerboard square pattern" and a related state table.

(2) the Imaging Array invented by Richard F. Lyon as U.S. Pat. No. 4,521,773.

A variation which cannot be claimed because it is not yet invented would be one based on a logical scheme exploiting the natural, hexagonal packing of bundled fibers.

A standard mouse has one to three, momentary switches called 'buttons' mounted on the top of its housing. An obvious improvement to the preferred and alternative embodiments of the fiber optical mouse would be to include at least one momentary, micro switch in the nose of device. A related improvement would be the addition of an on/off switch in the main body or in the end cap of the device. The on/off switch would be connected to a solenoid in the fixed unit. When 'on', this solenoid would switch power from the default device, a standard optical or mechanical mouse, to the fiber optical mouse. This variation would couple the quick action of the standard mouse for 'point-and-click' operations to the fine control of the fiber optical mouse for drawing and other close work.

What is claimed is:

1. In a relative-motion cursor control system having a motion detector,
an electronically passive surface bearing a static referent image over which image said motion detector operates to detect motion, and
a receiving means
which receives information from said motion detector so as to drive a cursor or other video image on a video display,
an optical mouse comprising said motion detector, said optical mouse comprising:
(a) an elongated body dimensioned to be hand-held and used in the manner of a pen;
(b) a tip at one end of said body for bearing against said surface, with said tip having a nib oriented said referent image when said tip so bears; and
(c) a plurality of individual sensory optical fibers operating as independent light guides and extending through at least a portion of said body, with
(i) the proximate ends of said fibers fixed in said nib to sense a pattern of light from a small area of said referent image immediately beneath said nib, and
(ii) the distant ends of said fibers fixed so that each sensory fiber illuminates a photodetector cell to produce an electronic signal for said receiving means.

2. An optical mouse according to claim 1 wherein said body houses illumination means for illuminating said referent image.

3. An optical mouse according to claim 2 wherein said illumination means comprises:
(a) at least one light source removed from said nib, and
(b) one or more illuminating fibers, each mounted with one end fixed in said nib in close proximity to said sensory fibers and with the other end fixed in said body so as to be injected with light from said source in the direction of said nib.

4. An optical mouse according to claim 2 wherein said illumination means comprises at least one light source and one or more sensory fibers injected with light from said source in the direction of said nib.

5. An optical mouse according to claim 1 wherein said body houses said photodetector cells.

6. An optical mouse according to claim 5 wherein said body houses electronic amplification means to at least partially process said electronic signals from said photodetector cells prior to said signals arriving at said receiving means.

7. In a relative-motion cursor control system having an electronically passive surface bearing a static referent image,
a motion detector operating over said surface and employing quadrature logic and contrast enhancement to determine movement of said motion detector relative said referent image, and a receiving means which receives information from said motion detector so as to drive a cursor or other video image on a video display,
an optical mouse comprising said motion detector, said optical mouse comprising:
(a) an elongated body dimensioned to be hand-held and used in the of a pen;
(b) a tip at one end of said body for bearing against said surface, with said tip having a nib oriented to address said referent image when said tip so bears; and
(c) eight or more sensory optical fibers operating as independent light guides and extending through at least a portion of said body, with
  (i) said fibers provided in two, X and Y, bundles of at least four fibers each, each of said X or Y bundles sensing optical information to detect movement in either the X or Y direction,
  (ii) the proximate ends of said fibers fixed in said nib to sense a pattern of light from a small area of said referent image immediately beneath said nib, and
  (iii) the distant ends of said fibers fixed so that each sensory fiber illuminates a photodetector cell to produce an electronic signal for said receiving means.

8. An optical mouse according to claim 7 wherein said body houses illumination means for illuminating said referent image.

9. An optical mouse according to claim 8 wherein said illumination means comprises
(a) at least one light source removed from said nib, and
(b) one or more illuminating fibers, each mounted with one end fixed in said nib in close proximity to said sensory fibers and with the other end fixed in said body so as to be injected with light from said source in the direction of said nib.

10. An optical mouse according to claim 8 wherein said illumination means comprises at least one light source and one or more sensory fibers injected with light from said source in the direction of said nib.

11. An optical mouse according to claim 7 wherein said body houses said photodetector cells.

12. An optical mouse according to claim 11 wherein said body houses electronic amplification means to at least partially process said electronic signals from said photodetector cells prior to said signals arriving at said receiving means.

13. An optical mouse according to claim 12 wherein said electronic amplification means comprises two, X and Y, electronic modules, each said X or Y electronic module including an operational-amplifier integrated circuit and related components, and each said X or Y electronic module amplifying electronic signals transduced through said photodetector cells from the respective X or Y bundle of sensory optical fibers.

14. An optical mouse according to claim 13 wherein said X and Y electronic modules are mounted in substantial axial alignment with and axial displacement from one another within said body.

* * * * *